United States Patent
Higgins

(10) Patent No.: US 8,194,925 B2
(45) Date of Patent: *Jun. 5, 2012

(54) METHOD, APPARATUS AND COMPUTER PROGRAM PRODUCT FOR RECOGNIZING A GESTURE

(75) Inventor: Robert P. Higgins, Seattle, WA (US)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/184,758

(22) Filed: Jul. 18, 2011

(65) Prior Publication Data

US 2011/0274358 A1 Nov. 10, 2011

Related U.S. Application Data

(63) Continuation of application No. 12/404,831, filed on Mar. 16, 2009, now Pat. No. 7,983,450.

(51) Int. Cl.
*G06K 9/00* (2006.01)
*G05D 1/00* (2006.01)
(52) U.S. Cl. .............................. 382/103; 382/291; 701/2
(58) Field of Classification Search .................. 382/100, 382/103, 104, 106, 107, 115, 153, 154, 162, 382/168, 173, 181, 189–203, 209, 224, 232, 382/254, 274, 276, 286–295, 305, 312; 703/6; 704/270; 1/1; 701/2
See application file for complete search history.

(56) References Cited

U.S. PATENT DOCUMENTS

| | | | | |
|---|---|---|---|---|
| 6,701,296 B1 * | 3/2004 | Kramer et al. | ................ | 704/270 |
| 6,724,915 B1 * | 4/2004 | Toklu et al. | ................... | 382/103 |
| 7,274,800 B2 * | 9/2007 | Nefian et al. | .................. | 382/103 |
| 7,366,645 B2 * | 4/2008 | Ben-Arie | ........................... | 703/6 |
| 7,383,254 B2 * | 6/2008 | Wen et al. | ............................ | 1/1 |
| 7,454,037 B2 | 11/2008 | Higgins | | |
| 2009/0222149 A1 * | 9/2009 | Murray et al. | .................... | 701/2 |

OTHER PUBLICATIONS

U.S. Appl. No. 12/363,342, filed Jan. 30, 2009.
Ram Nevatia, Jerry Hobbs, Bob Bolles; *An Ontology for Video Event Representation*; 2004; 10 pages.
Ram Nevatia, Tao Zhao, Somboon Hongeng; *Hierarchial Language-based Representation of Events in Video Streams*; 2003; 8 pages.
Chuan Wu, Yu-Fei Ma, Hong-Jiang Zhang, Yu-Zhuo Zhong; *Events Recognition by Semantic Interference for Sports Video*; 2002; pp. 805-808; IEEE.
Ahmet Ekin, A. Murat Tekalp; Rajiv Mehrotra; *Extraction of Semantic Description of Events Using Bayesian Networks*; 2001; pp. 1585-1588; IEEE.

(Continued)

*Primary Examiner* — Seyed Azarian
(74) *Attorney, Agent, or Firm* — Alston & Bird LLP

(57) ABSTRACT

A method, apparatus and computer program product are provided for recognizing a gesture in which one or more relationships are determined between a plurality of body parts and the gesture is then determined based upon these relationships. Each relationship may be determined by determining an angle associated with at least one joint, determining one or more states of a body part based upon the angle associated with at least one joint, and determining a probability of a body part being in each respective state. The gesture may thereafter be determined based upon the one or more states and the probability associated with each state of the body part. Directions may be provided, such as to an unmanned vehicle, based upon the gesture to, for example, control its taxiing and parking operations.

20 Claims, 4 Drawing Sheets

OTHER PUBLICATIONS

Somboom Hongeng, Ramakant Nevatia; *Large-Scale Event Detection Using Semi-Hidden Markov Models*; Proceedings of the Ninth IEEE International Conference on Computer Vision; 2003; 8 pages; IEEE Computer Society.

Yi Li, Linda G. Shapiro; *Object Recognition for content-Based Image Retrieval*; 2004; 19 pages.

Piciarelli C. et al. (Toward event recognition using trajectory analysis and prediction), pp. 131-134, IEEE, 2005.

Air Force, "Aircraft Operation and Movement on the Ground"; Air Force Instruction 11-218; May 26, 1994; 46 pages.

Navy, "Aircraft Signals NATOPS Manual"; NAVAIR 00-80T-113; Oct. 1, 1997; 108 sheets.

Higgins, Robert P.; *Automatic Event Recognition for Enhanced Situational Awareness in UAV Video*; Situation Management Workshop (SIMA) at IEEE Military Communications Conference (MILCOM);205.

Yu, Chih-Chang; Hwang, Jenq-Heng; Ho, Gang-Feng; Hsieh, Chaur-Heh; *Automatic Human Body Tracking and Modeling from Monocular Video Sequences*; IEEE International Conference on Acousticws, Speech, and Signal Processing; 2007; pp. 917-920.

Lementec, Jean-Christophe; Bajcsy, Peter; *Recognition of Arm Gestures Using Multiple Orientation Sensors: Gesture Classification*; $7^{th}$ Int'l IEEE Conference on Intelligent Transportation Systems; Oct. 2004; pp. 965-970.

Singh, Meghna, Mandal, Mrinal, Basu, Anup, *Visual Gesture Recognition for Ground Air Traffic Control Using the Randon Transform*; Int'l Conference on Intelligent Robots and Systems; Aug. 2005; pp. 2586-2591.

Elgammal, Ahmed; Shet, Vinay; Yacoob, Yaser; Davis, Larry S.; *Exemplar-Based Tracking and Recognition of Arm Gestures*; $3^{rd}$ Int'l Symposium on Image and Signal Processing and Analysis; 2003; pp. 656-661.

Object and Concept Recognition for Content-Based Image Retrieval; Department of Computer Science and Engineering; University of Washington; downloaded at: http://www.cs.washington.edu/research/imagedatabase/; Sep. 14, 2005; 1 page.

Adaptive Video Processing for Object and Event Recognition; Department of Computer Science and Engineering; University of Washington; downloaded at: http://www.cs.washington.edu/homes/yi/research2/object.html; Sep. 14, 2005; 3 pages.

Federal Aviation Administration Aeronautical Information Manual; Official Guide to Basic Flight Information and ATC Procedures; Table of Contents; downloaded at http://www.faa.gov/air_traffic/publications/atpubs/AIM/INDEX.HTM; Jun. 26, 2010; 2 pages.

Federal Aviation Administration Aeronautical Information Manual; Official Guide to Basic Flight Information and ATC Procedures; Section 3. Airport Operations; downloaded at: http://www.faa.gov/air_traffic/publications/atpubs/aim/Chap4/aim0403.html; Jun. 26, 2010; 35 pages.

\* cited by examiner

METHOD, APPARATUS AND COMPUTER PROGRAM PRODUCT FOR RECOGNIZING A GESTURE

CROSS-REFERENCE TO RELATED APPLICATIONS

This application is a continuation of U.S. application Ser. No. 12/404,831, filed Mar. 16, 2009, which is hereby incorporated herein in its entirety by reference.

TECHNOLOGICAL FIELD

Embodiments of the present invention relate generally to pattern recognition and, more particularly, to the automatic recognition of human gestures.

BACKGROUND

Gestures are utilized in a wide variety of applications to convey various messages or instructions. For example, a ground controller utilizes a series of gestures in order to direct an aircraft during taxiing, parking and other ground-based operations. These gestures are predefined and are recognized by the pilots who, in turn, follow the instructions provided via the gestures while the aircraft is on the ground. For example, some of the predefined gestures include gestures indicating all clear, start engine, pull chocks, turn left, turn right, slow down, proceed ahead, insert chocks, cut engine, or the like. In this regard, the Aeronautical Information Manual promulgated by the Federal Aviation Administration (FAA) defines eleven gestures via which ground controllers provide instructions to a pilot with respect to taxiing and parking operations of the aircraft. Similarly, various branches of the military service, such as the Air Force and the Navy, have promulgated manuals that define even more gestures to be employed by ground controllers in extended ground operations of an aircraft.

In addition to the gestures employed by aircraft ground controllers, a series of predefined gestures are also employed to provide directions or instructions in other situations. For example, police or other traffic directors may employ a series of gestures to direct vehicular traffic.

While the instructions provided via a series of gestures may be suitable in instances in which the pilot, driver or other operator of the vehicle recognizes and can respond to the instructions, the recognition of gestures used to provide instructions to an unmanned vehicle presents additional challenges. In one technique that permits an unmanned aerial vehicle (UAV) to respond to the gestures provided by a ground controller, a video of the ground controller may be captured and may be provided to a remote pilot or other operator. The remote pilot or other operator may watch the streaming video and interpret the gestures of the ground controller and, in turn, direct the UAV via remote control in accordance with the gestures. While this technique may allow a UAV to respond appropriately to the gestures of the ground controller, the operation of the UAV is no longer autonomous during this phase of is operation.

Another technique includes the use of specialized gloves worn by the ground controller. The gloves include electronics, such as position sensors, to detect the position of the hands of the ground controller. The gloves may include or otherwise be associated with a communication interface which provides the position information to an offboard controller. The controller, in turn, may determine the gesture based upon the position information and may, in turn, provide appropriate direction to the UAV to respond to the gesture. However, this technique requires additional equipment, such as the specialized gloves and a controller for interpreting the position signals provided by the gloves and for appropriately directing the UAV. Further, this technique would require a ground controller to behave differently, such as by donning the specialized gloves, to direct a UAV than with other manned aircraft.

Other techniques for recognizing gestures have also been proposed including techniques that rely upon a radon transformer. However, these techniques may, in some instances, impose limitations upon the gestures that may be recognized which may disadvantageously impact or limit the gesture recognition since different ground controllers may assume somewhat different poses in the course of providing the same gesture.

As such, it would be desirable to provide an improved technique for recognizing gestures, such as for use in conjunction with directing aircraft or other vehicles. In particular, it would be desirable to provide an improved technique for recognizing gestures that permits a ground controller to employ the same process regardless of the type of vehicle that is subject to the direction. Further, in conjunction with a UAV, it would be desirable to provide an improved technique for recognizing gestures that allows for the control of a UAV, such as during taxiing and parking operations, that does not require the assistance of a manual operator.

BRIEF SUMMARY

Methods, apparatus and computer program products are therefore provided for recognizing a gesture in an automated fashion. As such, embodiments of the method, apparatus and computer program product may permit an unmanned vehicle to be directed in response to the automated recognition of the gestures provided by a ground controller or the like. Further, embodiments of the method, apparatus and computer program product permit a ground controller to utilize the same gestures and the same process of effecting the gestures with both manned and unmanned vehicles. Additionally, embodiments of the method, apparatus and computer program product allow for some variations in the gestures while still permitting reliable recognition of the gesture, thereby accommodating deviations that may occur between ground controllers.

In one embodiment, a method for recognizing a gesture is provided in which one or more relationships between a plurality of body parts are determined and the gesture is then determined by a gesture recognition unit based upon these relationships. In this regard, each relationship is determined by determining an angle associated with at least one joint, determining one or more states of a body part based upon the angle associated with at least one joint, and determining a probability of the body part being in each respective state. The gesture may then be determined based upon one or more states and the probability associated with each state of the body part.

The determination of a gesture based on the body part relationships is a pattern recognition problem with the body part relationships as the features used in the pattern recognition. The determination of the gesture may utilize a dynamic Bayesian network and, in one embodiment, may initially include the determination of at least one subgesture utilizing another dynamic Bayesian network prior to utilizing the dynamic Bayesian network to determine the gesture based at least in part upon the subgesture.

In one embodiment, the determination of one or more relationships between a plurality of body parts includes a determination of the angle associated with a first joint, a determination of one or more states of a first body part based upon the angle associated with the first joint and then a determination of the probability of the first body part being in a respective state. Similarly, the determination of one or more relationships between a plurality of body parts of this embodiment may also include a determination of the angle associated with a second joint, a determination of one or more states of a second body part based upon the angle associated with the second joint and then a determination of the probability of the second body part being in a respective state. In one embodiment, the first joint may be a shoulder with the associated angle defined by the elbow, shoulder and torso. Correspondingly, the first body part may be an upper arm. In this embodiment, the second joint may be an elbow with an associated angle defined by the shoulder, elbow and wrist. Correspondingly, the second body part may be a forearm.

A corresponding apparatus and computer program product may also be provided according to other embodiments of the present invention. For example, an apparatus for recognizing a gesture may include the processor configured to determine one or more relationships between a plurality of body parts and then configured to determine the gesture based upon these relationships. In another embodiment, a computer program product for recognizing a gesture may include at least one computer-readable storage medium having computer-executable program instructions stored therein. The computer-executable program instructions may include program instructions configured to determine one or more relationships between a plurality of body parts and program instructions configured to determine the gesture based upon these relationships.

The features, functions and advantages can be achieved independently in various embodiments of the present invention or may be combined in yet other embodiments.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
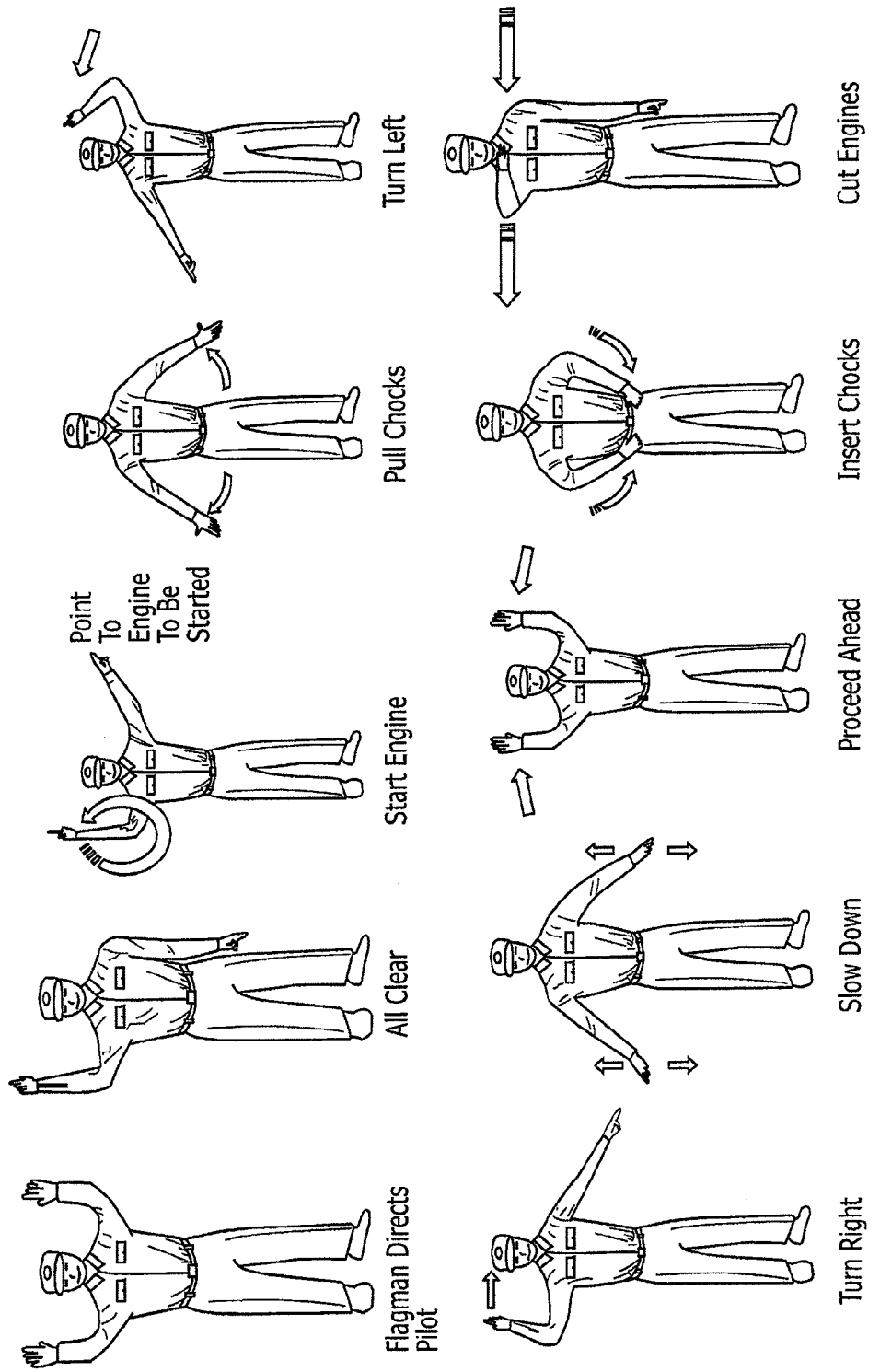
FIG. 1 is a representation of a plurality of gestures that may be automatically recognized by embodiments of the present invention.

An apparatus, method and computer program product are provided according to embodiments of the present invention for recognizing a gesture. In one example, the gestures which are recognized are the gestures that are employed by a ground controller in order to direct a vehicle, such as an aircraft. In this regard and as shown in FIG. 1, a number of predefined gestures have been established and documented by the FAA and by the various branches of the U.S. military service including the Air Force and the Navy. Based upon the predefined gestures provided by a ground controller, a pilot of an aircraft can respond appropriately such as by powering its engines up or down, turning left to right, or the like. In addition to the predefined gestures established for the ground control of aircraft, other types of gestures may be recognized including the gestures performed by a police officer or other traffic director for providing directions to vehicular traffic. However, for purposes of illustration, but not of limitation, embodiments of the apparatus, method and computer program product will be hereinafter described in conjunction with the recognition of gestures performed by ground controllers in conjunction with the ground operations, e.g., taxiing and parking operations, of aircraft, such as an unmanned aircraft, e.g., a UAV.

Figure 2:
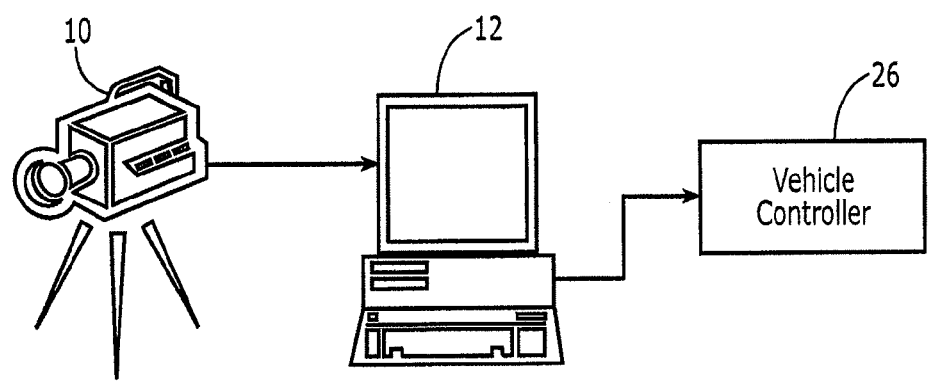
FIG. 2 is a schematic representation of an apparatus for recognizing a gesture in accordance with one embodiment of the present invention.

In order to recognize a gesture, a sequence of images of the person making the gesture, such as the ground controller, is initially captured. In this regard, many gestures have a common state appearance such that the only way to recognize a particular gesture is to examine the states over a period of time. For some gestures, the gesture is defined as the state remaining stable over a period of time. However, even in this instance, the gesture is recognized from a sequence of images to confirm the stability of the state. As shown in FIG. 2, the images may be captured by a camera or any other type of image sensor 10 configured to capture a sequence of images, such as a video. As each image is captured, the image may be provided to a processing device 12, such as a dedicated processor, a personal computer, a workstation or any other type of appropriately configured processor. As described below, the processing device is configured to process the images provided by the image sensor and to recognize the gesture. Based upon the gesture, the processing device may then provide instructions, such as to a UAV to take the action indicated by the gesture.

Figure 3:
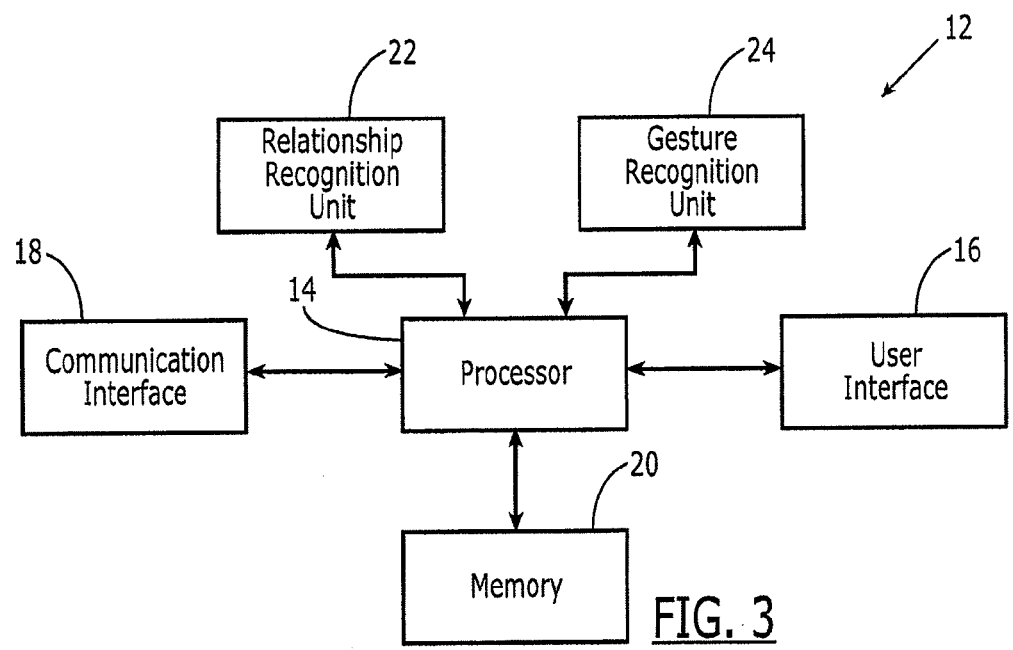
FIG. 3 is a block diagram of an apparatus for recognizing a gesture according to one embodiment of the present invention.

Although the processing device 12 may be configured in various manners, the processing device in one embodiment is depicted in FIG. 3. As shown, the processing device may include a processor 14, a user interface 16, a communication interface 18 and a memory device 20. The memory device may be configured to store information, data, applications, instructions or the like for enabling the computing device to carry out various functions in accordance with exemplary embodiments of the present invention. For example, the memory device may be configured to store the images provided by the image sensor 10, as well as data from which a plurality of predefined gestures may be determined. Additionally or alternatively, the memory device may be configured to store instructions for execution by the processor.

The processor 14 may be embodied in a number of different ways. For example, the processor may be embodied as a processing element, a coprocessor, a controller or various other processing means or devices including integrated circuits such as, for example, an ASIC (application specific integrated circuit) or FPGA (field-programmable gate array) or combinations thereof. In an exemplary embodiment, the processor may be specifically configured to execute instructions stored in the memory device 20 or otherwise accessible to the processor. As such, whether configured by hardware or software methods, or by a combination thereof, the processor may represent an entity capable of performing operations according to embodiments of the present invention while configured accordingly. Thus, for example, when the processor is embodied as an ASIC, FPGA or the like, the processor may be specifically configured hardware for conducting the operations described herein. Alternatively, as another example, when the processor is embodied as an executor of software instructions, the instructions specifically configure the processor to perform the algorithms and operations described herein.

Meanwhile, the communication interface 18 may be embodied as any device or means embodied in either hardware, software, or a combination of hardware and software that is configured to receive data from the image sensor 10 and transmit instructions, as described below, to a vehicle controller or the like in response to the recognition of each of the predefined gestures. In this regard, the communication interface may include, for example, an antenna and supporting hardware and/or software for enabling wireless communications.

As shown in FIG. 3, the processing device 12 may also include or be in communication with a relationship determination unit 22 configured to determine one or more relationships between a plurality of body parts and a gesture recognition unit 24 configured to determine the gesture based upon these relationships. The relationship determination unit may be any means, such as a device or circuitry embodied in hardware, a computer program product or a combination thereof that is configured to determine one or more relationships between a plurality of body parts as described below. Likewise, the gesture recognition unit may be any means such as a device or circuitry embodied in hardware, a computer program product or a combination thereof that is configured to recognize a gesture as described below. Although the relationship determination unit and the gesture recognition unit are depicted to be separate from the processor 14, the processor of one embodiment may include or otherwise control one or both of the relationship determination unit and the gesture recognition unit. Alternatively, the relationship determination unit and/or the gesture recognition unit may be embodied by another processor, such as a co-processor, specifically configured to perform their respective functions.

Figure 4:
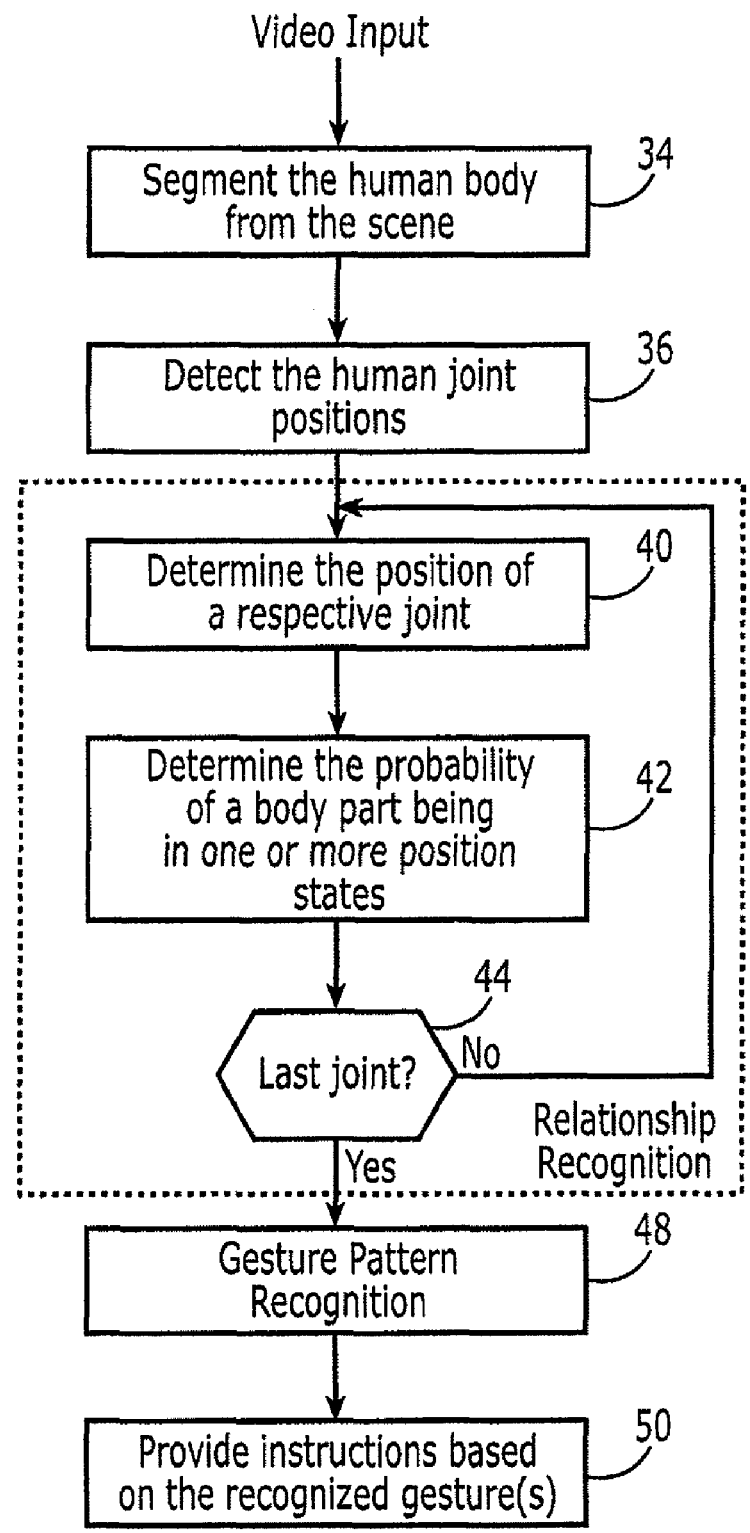
FIG. 4 is a flow chart showing the operations performed by the method, apparatus and computer program product of embodiments of the present invention.

In operation as shown in FIG. 4, the processor of one embodiment is configured to segment the human body that appears in the image from the scene background and to then detect the position of the major joint positions in the human body, such as the shoulder, elbow and wrist. See operations 34 and 36 of FIG. 4. As will be understood by one skilled in the art, the processor may segment the human body from the scene background and detect the position the major joint positions in the human body in accordance with any of a variety of conventional techniques including those described, for example, by Elgammal, et al., "Exemplar-based Tracking Recognition of Arm Gestures", Proceedings of the Third International Symposium on Image and Signal Processing and Analysis, pp. 656-61 (2003).

Thereafter, the apparatus, method and computer program product of embodiments of the present invention are configured to recognize a gesture based upon the relationship(s) between a plurality of body parts. In this regard, the relationship determination unit 22 may be configured to receive the joint position data following segmentation of the human body from the scene background and the detection of the position of the major joint positions and to then determine the relationships between a plurality of body parts for each of one or more images. As described below, the relationship determination unit may be configured to identify one or more candidate states of a body part and to associate a respective probability with each candidate state such that the probability defines the likelihood of the body part being in the respective state.

In order to determine the relationships between a plurality of body parts, the relationship determination unit 22 determines the angles of the joints for which the joint positions have previously been determined and then determines, for each joint, the respective probability of a body part being in one or more states based upon the joint angle. With respect to the angle that is associated with a joint, the angles associated with the elbow and the shoulder will be described for purposes of example, but the angles associated with other joints, such as the wrist, may also or alternatively be determined if so desired. With respect to the elbow, however, the angle associated with the elbow is that angle defined between the forearm and the upper arm. Likewise, the angle associated with the shoulder is the angle defined between the torso and the upper arm. In either instance, the angle associated with the joint is defined by the angle between the body parts or portions located on opposite sides of the joint.

In one embodiment as depicted in FIG. 4, the relationship determination unit 22 may determine the angle associated with a first joint, such as a shoulder, and may then determine one or more candidate states of a first body part, such as the upper arm, based upon the angle associated with the first joint as well as the probability of the first body part being in a respective candidate state. See operations 40 and 42. The relationship determination unit may then determine the angle associated with another joint, such as an elbow, and may then determine one or more candidate states of another body part, such as the forearm, based upon the angle associated with the other joint as well as the probability of the other body part being in a respective candidate state. See operations 40-44. This process may be repeated until the relationship determination unit has recognized the relationships of all of the body parts that are required by the different gestures that are desired to be recognized. Although illustrated and described herein to be performed in a sequential manner, the relationship determination unit of one embodiment may concurrently analyze the plurality of joints in parallel.

The relationship determination unit 22 may determine the angle associated with a respective joint by analyzing the joint position data from the segmentation to determine the angle between the body parts that are interconnected by the joint to define the angle associated with the joint. In this regard, the joint angle is determined by considering the relative positions of the joints, as has been previously determined. For example, the elbow angle is determined by considering the positions of the shoulder, elbow, and wrist. The two points representing the shoulder and the elbow define a line. Also, the two points representing the elbow and the wrist define a line. The angle at which these two lines intersect is the elbow angle. The angles for the other joints can be determined in a similar manner. In some cases, two angles are required to represent the relationship between body parts. For example, the position of the upper arm relative to the torso is represented by two angles. The first angle is the hip-shoulder-elbow angle, which represents the elevation angle of the upper arm with respect to the torso. The second angle is the right shoulder-left shoulder-elbow angle which represents the azimuth angle of the upper arm with respect to the torso. As such, the relationship determination unit of one embodiment may be configured to determine two or more angles if required to represent the relationship between the body parts.

The joint angles of one embodiment may be encoded in a set of discrete states. For example, the position of the upper arm with respect to the torso may be encoded with the set of discrete states: "up", "down", "out", and "forward". Depending on the granularity of the gestures that are to be recognized, additional states can be used such as "down-angle" to represent a state where the upper arm is at about a 45 degree angle from the torso. In even finer granularity systems, a continuous state variable can be used, with the continuous state variable being the joint angle(s).

Figure 5:
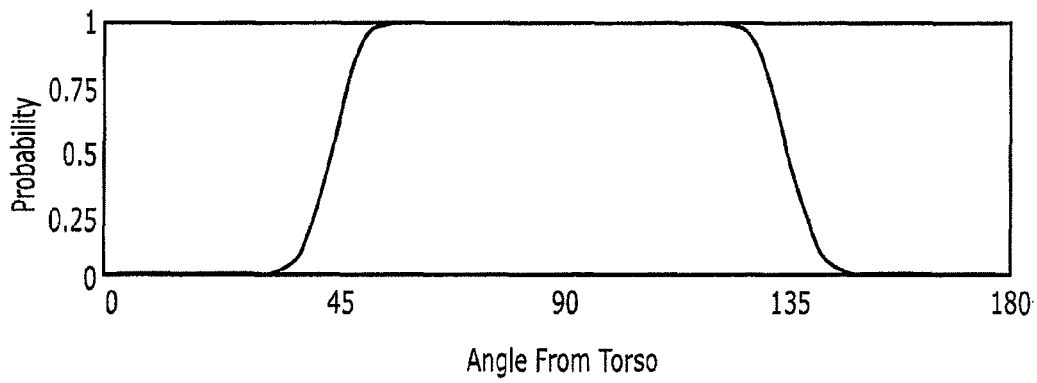
FIG. 5 is a graphical representation of the probability of a body part being in a respective position state as a function of the angle of the associated joint.

Probability values are assigned to the discrete position states. With respect to the elbow angle which represents the relationship between the forearm and the upper arm, for example, three discrete states may be of interest: "extended", "bent", and "closed". For an elbow angle of 180 degrees there is a very high probability the arm is in the "extended" state, and a low probability the arm is in the "bent" or "closed" state. For an elbow angle of 90 degrees, there is a high probability the arm is in the "bent" state, and a low probability that the arm is in the "extended" or "closed" states. But for an elbow angle of 135 degrees, there is an equal probability that the arm is in either the "extended" or "bent" states. A probabilistic transition between the states may be defined as shown, for example, in FIG. 5. In other embodiments, a step transition can be defined, where there is only a binary probability of either 0 or 1. For each body part, the plurality of discrete states as well as the state probability, including, for example, a step transition, may be stored in the memory device 20 and accessible by the relationship recognition unit 22.

The relationship recognition process may be applied to all joints that are being used to create the gestures that are to be recognized. While the foregoing examples of the relationship recognition process analyze upper body parts, the relationship recognition process may also or alternatively analyze lower body parts. For example, if a defined gesture requires that a leg move in a particular way, the joint angles for the leg would also be estimated and state encoded.

The relationship determination unit 22 therefore determines the angle associated with each joint and, in turn, then determines the probability associated with each of a plurality of different candidate states based upon the angle associated with the joint. For example, the relationship determination unit can determine the shoulder angle and, in turn, determine the probability of the upper arm being in each of a plurality of different position states based upon the shoulder angle. Likewise, the relationship determination unit can determine the elbow angle and, in turn, determine the probability of the lower arm being in each of a plurality of different position states based upon the elbow angle. Although described herein in conjunction with the analysis of a shoulder and an elbow, the relationship determination unit may be configured to determine the relationship between a plurality of body parts based upon an analysis of the angle that is associated other joints or with additional joints.

After the relationship determination unit 22 has determined the relationship between a plurality of body parts in a first or initial image, the relationship determination unit of one embodiment is configured to repeat the process for one or more subsequent or sequential images to determine the relationship between the plurality of body parts in the subsequent images. In this regard, the processor 14 may direct the image sensor 10 to capture a sequence of images, or the image sensor may otherwise be configured to capture the sequence of images, such as at a rate, for example, of 30 frames per second. For each image of the sequence, the relationship determination unit may then repeat the same process described above in conjunction with operations 34-44 in order to determine the relationship between the plurality of body parts and the recognized relationships are then provided to the gesture recognition unit 24 described below in order to determine the gesture. All gestures are defined with respect to the flow of time. For example, in some instances in which a gesture is static and includes only a single pose, the sequence of images may be identical but must be considered in order to confirm that the relationship states have not changed over time. In other instances in which a gesture is comprised of a sequence of poses, however, the sequence of images will differ from one another.

Following the determination of the relationships between the plurality of body parts, the resulting gesture is then determined. In this regard, the gesture recognition unit 24 may evaluate the relationship between the plurality of body parts including the candidate states and the probability associated with each candidate state as determined by the relationship determination unit 22 for the sequence of images. While the evaluation may be performed in various manners, the gesture recognition unit may include one or more Bayesian networks.

The gesture recognition unit 24 performs a recognition of a pattern that defines each of the gestures to be recognized. One embodiment includes a set of dynamic Bayesian networks (DBN). In one embodiment, each DBN encodes a defined gesture to be recognized. However, it is possible that a single DBN can be used to recognize more than one gesture in other embodiments. In general, the structure of each DBN configured to recognize a respective gesture will be different from the other DBNs configured to recognize other gestures, but all of the DBNs are processed as dynamic Bayesian networks. In this regard, the gesture recognition unit, such as the DBNs implemented by the gesture recognition unit, may receive information from the relationship recognition unit 22 regarding the relationships between a plurality of body parts, i.e., the positions of a plurality of body parts, in each of one or more images. As described above, the information regarding the relationships between a plurality of body parts may include the candidate states of one or more body parts and the probability associated with each candidate state. In one embodiment, some of the gestures are made up of sub-gestures, which are essentially gestures themselves. The gesture recognition unit of this embodiment may also include a separate DBN to recognize these sub-gestures, the results of which are then fed into a DBN for recognizing the gesture itself, along with information regarding the relationships between a plurality of body parts as noted above.

For example, in the case of a gesture to direct an aircraft to turn left, the arm on the ground controller's left (from the viewpoint of the aircraft observer) is straight out from the body, and the arm on the right is out with the forearm waving back and forth, as shown in FIG. 1. In this example, a sub-gesture of the left turn gesture is the arm on the right waving back and forth. This "waving" sub-gesture may be recognized by a separate DBN with the output of the "waving" sub-gesture DBN being an input to the DBN configured to recognize the left turn gesture. In this way, the joint angle state information is used to determine the probability of the "waving" gesture, and the "waving" gesture is used in part to determine the probability of the "left turn" gesture, thereby creating a hierarchical scheme for gesture recognition.

Figure 6:
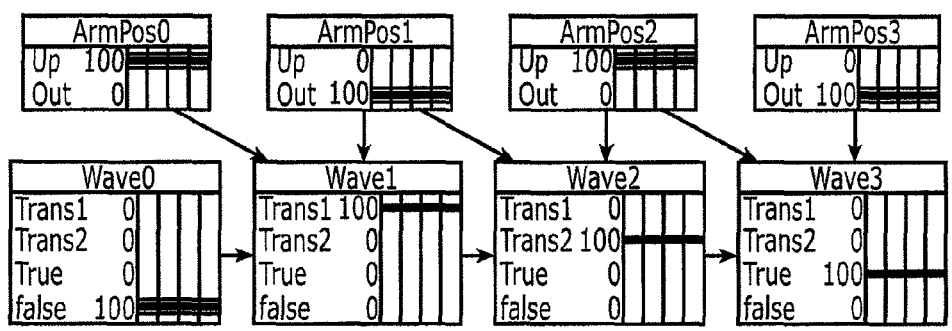
FIG. 6 is a representation of an example Bayesian network for recognizing a sub-gesture in accordance with one embodiment of the present invention.
Figure 7:
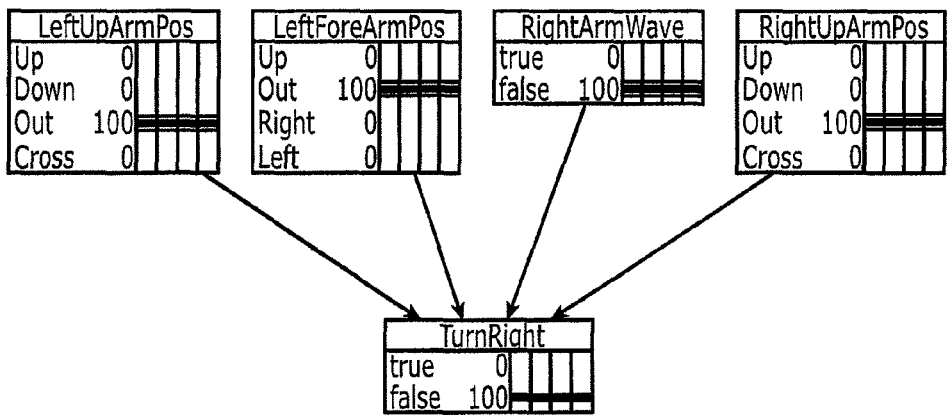
FIG. 7 is a representation of an example Bayesian network for recognizing a gesture in accordance with one embodiment of the present invention.

FIG. 6 shows an example of a DBN for the "waving" sub-gesture, and FIG. 7 shows an example of a DBN for the left turn gesture that uses the waving sub-gesture as an input. With respect to FIG. 6, a series of time slices is depicted for the DBN with each time slice (as represented by the numerical designation following the respective parameters, such as "Wave", e.g., Wave0, Wave1, etc.) representing the output of the DBN at a particular moment in time based upon inputs representative of the same moment in time and/or one or more earlier moments in time. In this regard, it is noted that the Bayesian network for each time slice is the same, and the connections between time slices of the DBN are the same, but the inputs under consideration during a later time slice may differ from the inputs that were considered during an earlier time slice.

By way of example, with regards to the DBN for determining the "wave" sub-gesture in FIG. 6, four time intervals are indicated, namely, 0, 1, 2 and 3. The arm position (designated ArmPos) in the top row of blocks is shown as alternating between the Up and Out states over the four time intervals, i.e., the definition of the "wave" gesture. The probability associated with each arm state is also shown in FIG. 6. For example, the probability of the Up state during time slice 0 is 100%, while the probability of the Out state during the same time slice is 0%. The output of the "wave" sub-gesture is also shown in FIG. 6 at the four time intervals as designated Wave0, Wave1, Wave2 and Wave3. By way of example, the Wave0 block on the left of the diagram shows an initial condition of "false", i.e. no "wave" gesture. Additionally, blocks Wave1 and Wave2 identify internal states of the gesture, which are labeled as Trans1 and Trans2, in which insufficient information is available to conclude that the gesture is or is not a wave, generally as a result of having an insufficient number of time slices of data. In this implementation, for example, alternating states of the arm position are required to indicate a "true" output state for the "wave" gesture. As time proceeds and alternating arm positions states are recognized, the "wave" gesture states proceeds from false to Trans1 to Trans2 to True, indicating that the "wave" gesture has been recognized.

The DBN for recognizing the wave sub-gesture may be configured to recognize the wave sub-gesture in accordance with the probability table set forth below in which WaveIn is the input to the wave determination in the current time slice of the wave determination from the prior time slice. For example, in determining Wave3 during time slice 3, WaveIn is the value of Wave2, namely, Trans2 in this example. Also, ArmPos(i-1) and ArmPos(i) are the arm positions (as determined by the relationship recognition unit 22 during the current time slice i and the prior time slice (i-1). The probability table may be stored in the memory device 20 and may be accessible by the gesture recognition unit 24 in order to appropriately recognize the sub-gesture based upon the relationships between various body parts at different points in time that are provided by the relationship recognition unit 22 as input.

| WaveIn | ArmPos(i-1) | ArmPos(i) | False | Trans1 | Trans2 | True |
|--------|-------------|-----------|-------|--------|--------|------|
| False  | Up          | Up        | 1     | 0      | 0      | 0    |
| False  | Up          | Out       | 0     | 1      | 0      | 0    |
| False  | Out         | Up        | 0     | 1      | 0      | 0    |
| False  | Out         | Out       | 1     | 0      | 0      | 0    |
| Trans1 | Up          | Up        | 0     | 1      | 0      | 0    |
| Trans1 | Up          | Out       | 0     | 0      | 1      | 0    |
| Trans1 | Out         | Up        | 0     | 0      | 1      | 0    |
| Trans1 | Out         | Out       | 0     | 1      | 0      | 0    |
| Trans2 | Up          | Up        | 0     | 0      | 1      | 0    |
| Trans2 | Up          | Out       | 0     | 0      | 0      | 1    |
| Trans2 | Out         | Up        | 0     | 0      | 0      | 1    |
| Trans2 | Out         | Out       | 0     | 0      | 1      | 0    |
| True   | Up          | Up        | 0     | 0      | 0      | 1    |
| True   | Up          | Out       | 0     | 0      | 0      | 1    |
| True   | Out         | Up        | 0     | 0      | 0      | 1    |
| True   | Out         | Out       | 0     | 0      | 0      | 1    |

In addition to a DBN for any sub-gesture, the gesture recognition unit 24 of one embodiment includes a DBN for recognizing a gesture based upon the position of one or more body parts as represented, for each body part, by the one or more candidate states of the body part and the probability associated with each state, as determined by the relationship recognition unit 22. Moreover, in instances in which a gesture is based not only upon the position of one or more body parts, but also one or more sub-gestures, the DBN for recognizing a gesture may also receive an indication of whether or not the sub-gesture was recognized, such as by receiving the output of the DBN for the sub-gesture.

By way of example, the DBN employed by the gesture recognition unit 24 of one embodiment to recognize a "turn-left" gesture is shown in FIG. 7. As noted above, the gesture recognition unit of one embodiment includes a plurality of DBNs, each of which is configured to recognize a respective gesture or sub-gesture. With respect to the embodiment of FIG. 7, the DBN receives the outputs of the relationship recognition unit 22 with respect to the position of the left upper arm (LeftUpArmPos), the left forearm (LeftForeArmPos) and right upper arm (RightUpArmPos) as well as the output of a DBN, such as depicted in FIG. 6, configured to recognize a wave sub-gesture by the right arm (RightArmWave). As shown with respect to the positions of the various body parts, the relationship recognition unit of one embodiment provides and the gesture recognition unit receives an indication of the position and the probability of the respective body part being in the position. The DBN of the gesture recognition unit of this embodiment may be configured to recognize a "turn-left" gesture in accordance with the state transition table set forth below. Although the state transition table merely indicates if the "turn-left" gesture is true or false, the gesture recognition unit may also be configured to determine the probability associated with each of the output states, e.g., 75% chance of false and 25% chance of true. As noted above with respect to the probability table, the state transition table may be stored in the memory device 20 and may be accessible by the gesture recognition unit in order to appropriately recognize the gesture based upon the relationships between various body parts at different points in time that are provided by the relationship recognition unit 22 as well as information regarding the recognition of one or more sub-gestures by an appropriately configured sub-gesture DBN.

| LeftUpArmPos | LeftForeArmPos | RightArmWave | RightUpArmPos | TurnLeft |
|---|---|---|---|---|
| Up | Up | True | Up | False |
| Up | Up | True | Down | False |
| Up | Up | True | Out | False |
| Up | Up | True | Cross | False |
| Up | Up | False | Up | False |
| Up | Up | False | Down | False |
| Up | Up | False | Out | False |
| Up | Up | False | Cross | False |
| Up | Out | True | Up | False |
| Up | Out | True | Down | False |
| Up | Out | True | Out | False |
| Up | Out | True | Cross | False |
| Up | Out | False | Up | False |
| Up | Out | False | Down | False |
| Up | Out | False | Out | False |
| Up | Out | False | Cross | False |
| Up | Right | True | Up | False |
| Up | Right | True | Down | False |
| Up | Right | True | Out | False |
| Up | Right | True | Cross | False |
| Up | Right | False | Up | False |
| Up | Right | False | Down | False |
| Up | Right | False | Out | False |
| Up | Right | False | Cross | False |
| Up | Left | True | Up | False |
| Up | Left | True | Down | False |
| Up | Left | True | Out | False |
| Up | Left | True | Cross | False |
| Up | Left | False | Up | False |
| Up | Left | False | Down | False |
| Up | Left | False | Out | False |
| Up | Left | False | Cross | False |
| Down | Up | True | Up | False |
| Down | Up | True | Down | False |
| Down | Up | True | Out | False |
| Down | Up | True | Cross | False |
| Down | Up | False | Up | False |
| Down | Up | False | Down | False |
| Down | Up | False | Out | False |
| Down | Up | False | Cross | False |
| Down | Out | True | Up | False |
| Down | Out | True | Down | False |
| Down | Out | True | Out | False |
| Down | Out | True | Cross | False |
| Down | Out | False | Up | False |
| Down | Out | False | Down | False |
| Down | Out | False | Out | False |
| Down | Out | False | Cross | False |
| Down | Right | True | Up | False |
| Down | Right | True | Down | False |
| Down | Right | True | Out | False |
| Down | Right | True | Cross | False |
| Down | Right | False | Up | False |
| Down | Right | False | Down | False |
| Down | Right | False | Out | False |
| Down | Right | False | Cross | False |
| Down | Left | True | Up | False |
| Down | Left | True | Down | False |
| Down | Left | True | Out | False |
| Down | Left | True | Cross | False |
| Down | Left | False | Up | False |
| Down | Left | False | Down | False |
| Down | Left | False | Out | False |
| Down | Left | False | Cross | False |
| Out | Up | True | Up | False |
| Out | Up | True | Down | False |
| Out | Up | True | Out | False |
| Out | Up | True | Cross | False |
| Out | Up | False | Up | False |
| Out | Up | False | Down | False |
| Out | Up | False | Out | False |
| Out | Up | False | Cross | False |
| Out | Out | True | Up | False |
| Out | Out | True | Down | False |
| Out | Out | True | Out | True |
| Out | Out | True | Cross | False |
| Out | Out | False | Up | False |
| Out | Out | False | Down | False |

-continued

| LeftUpArmPos | LeftForeArmPos | RightArmWave | RightUpArmPos | TurnLeft |
|---|---|---|---|---|
| Out | Out | False | Out | False |
| Out | Out | False | Cross | False |
| Out | Right | True | Up | False |
| Out | Right | True | Down | False |
| Out | Right | True | Out | False |
| Out | Right | True | Cross | False |
| Out | Right | False | Up | False |
| Out | Right | False | Down | False |
| Out | Right | False | Out | False |
| Out | Right | False | Cross | False |
| Out | Left | True | Up | False |
| Out | Left | True | Down | False |
| Out | Left | True | Out | False |
| Out | Left | True | Cross | False |
| Out | Left | False | Up | False |
| Out | Left | False | Down | False |
| Out | Left | False | Out | False |
| Out | Left | False | Cross | False |
| Cross | Up | True | Up | False |
| Cross | Up | True | Down | False |
| Cross | Up | True | Out | False |
| Cross | Up | True | Cross | False |
| Cross | Up | False | Up | False |
| Cross | Up | False | Down | False |
| Cross | Up | False | Out | False |
| Cross | Up | False | Cross | False |
| Cross | Out | True | Up | False |
| Cross | Out | True | Down | False |
| Cross | Out | True | Out | False |
| Cross | Out | True | Cross | False |
| Cross | Out | False | Up | False |
| Cross | Out | False | Down | False |
| Cross | Out | False | Out | False |
| Cross | Out | False | Cross | False |
| Cross | Right | True | Up | False |
| Cross | Right | True | Down | False |
| Cross | Right | True | Out | False |
| Cross | Right | True | Cross | False |
| Cross | Right | False | Up | False |
| Cross | Right | False | Down | False |
| Cross | Right | False | Out | False |
| Cross | Right | False | Cross | False |
| Cross | Left | True | Up | False |
| Cross | Left | True | Down | False |
| Cross | Left | True | Out | False |
| Cross | Left | True | Cross | False |
| Cross | Left | False | Up | False |
| Cross | Left | False | Down | False |
| Cross | Left | False | Out | False |
| Cross | Left | False | Cross | False |

In this regard, the gesture recognition unit 24 may identify one or more different gestures that each has some probability of being represented within the image along with the probability of each respective gesture. See operation 48 of FIG. 4. The gesture recognition unit of one embodiment may then identify the gesture having the greatest probability as the gesture that has been made by the ground controller. However, if none of the gestures has a probability greater than a predefined threshold, the gesture recognition unit may simply report that the gesture was not recognized with sufficient certainty.

Once the gesture recognition unit 24 has recognized the gesture, the processor 14 of one embodiment notifies a vehicle controller 26, such as a UAV controller, and instructs the vehicle controller to cause the vehicle to perform the action associated with the recognized gesture, such as to turn left, start an engine, slow down or the like. See operation 50 of FIG. 4. In embodiments in which an unmanned vehicle, such as a UAV, is the subject of the control, the unmanned vehicle may then respond to the gesture in a comparable fashion, albeit in an automated and autonomous manner, to the way in which a manned vehicle responds without requiring the ground controller to have any special equipment or to provide any additional or different signals.

FIG. 4 is a flowchart of a system, method and program product according to exemplary embodiments of the invention. It will be understood that each block or step of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, the computer program instructions which embody the procedures described above may be stored by the memory device 20 and executed by the processor 14, relationship recognition unit 22 and/or gesture recognition unit 24. As will be appreciated, any such computer program instructions may be loaded onto a computer or other programmable apparatus (i.e., hardware) to produce a machine, such that the computer program product including the instructions which execute on the computer or other programmable apparatus creates means for implementing the functions specified in the flowchart block(s) or step(s). These computer program instructions may also be stored in a computer-readable memory that can direct a computer or other programmable apparatus to function in a particular manner, such that the instructions stored in the computer-readable memory produce an article of manufacture including instruction means which implement the function specified in the flowchart block(s) or step(s). The computer program instructions may also be loaded onto a computer or other programmable apparatus to cause a series of operational steps to be performed on the computer or other programmable apparatus to produce a computer-implemented process such that the instructions which execute on the computer or other programmable apparatus provide steps for implementing the functions specified in the flowchart block(s) or step(s).

Accordingly, blocks or steps of the flowchart support combinations of means for performing the specified functions, combinations of steps for performing the specified functions and program instruction means for performing the specified functions. It will also be understood that one or more blocks or steps of the flowchart, and combinations of blocks or steps in the flowchart, can be implemented by special purpose hardware-based computer systems which perform the specified functions or steps, or combinations of special purpose hardware and computer instructions.

Many modifications and other embodiments of the inventions set forth herein will come to mind to one skilled in the art to which these inventions pertain having the benefit of the teachings presented in the foregoing descriptions and the associated drawings. For example, while the gesture recognition unit 24 has been described to include Bayesian networks in one embodiment, the gesture recognition unit may perform its function in a different manner, such as by utilizing other types of networks, e.g., neural networks, Hidden Markov Models or the like. (Hidden Markov Models are mathematically equivalent to a dynamic Bayesian network.) Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A method for recognizing a gesture comprising:
    determining one or more relationships between a plurality of body parts, wherein determining each relationship comprises:
        determining an angle associated with at least one joint; and
        determining one or more states of a body part based upon the angle associated with at least one joint; and
        determining a probability of the body part being in each respective state; and
    determining the gesture with a gesture recognition unit based upon the one or more states and the probability associated with each state of the body part, wherein determining the gesture comprises identifying one or more candidate gestures having respective probabilities of being the gesture and reporting that the gesture was not recognized in an instance in which the respective probabilities fail to satisfy a predefined threshold.

2. A method according to claim 1 wherein determining the gesture comprises utilizing a dynamic Bayesian network to determine the gesture.

3. A method according to claim 2 wherein determining the gesture further comprises determining at least one subgesture utilizing another dynamic Bayesian network prior to utilizing the dynamic Bayesian network to determine the gesture based at least in part upon the subgesture.

4. A method according to claim 1 wherein determining the gesture comprises determining a respective probability associated with each of a plurality of different gestures.

5. A method according to claim 1 wherein determining one or more relationships between a plurality of body parts comprises:
    determining the angle associated with a first joint;
    determining one or more states of a first body part based upon the angle associated with the first joint;
    determining a probability of the first body part being in each respective state;
    determining the angle associated with a second joint;
    determining one or more states of a second body part based upon the angle associated with the second joint; and
    determining a probability of the second body part being in each respective state.

6. A method according to claim 5 wherein the first joint is a shoulder with the associated angle defined by the elbow, shoulder and torso and the first body part is an upper arm, and wherein the second joint is an elbow with the associated angle defined by the shoulder, elbow and wrist and the second body part is a forearm.

7. A method according to claim 1 further comprising providing directions to an unmanned vehicle based upon the gesture.

8. An apparatus for recognizing a gesture comprising:
    a processor configured to determine one or more relationships between a plurality of body parts, wherein the processor is configured to determine each relationship by:
        determining an angle associated with at least one joint; and
        determining one or more states of a body part based upon the angle associated with at least one joint; and
        determining a probability of the body part being in each respective state, and
    wherein the processor is configured to determine the gesture based upon the one or more states and the probability associated with each state of the body part, and wherein the processor is configured to determine the gesture by identifying one or more candidate gestures having respective probabilities of being the gesture and reporting that the gesture was not recognized in an instance in which the respective probabilities fail to satisfy a predefined threshold.

9. An apparatus according to claim 8 wherein the processor is configured to determine the gesture by utilizing a dynamic Bayesian network.

10. An apparatus according to claim 9 wherein the processor is configured to determine the gesture by determining at least one subgesture utilizing another dynamic Bayesian network prior to utilizing the dynamic Bayesian network to determine the gesture based at least in part upon the subgesture.

11. An apparatus according to claim 8 wherein the processor is configured to determine the gesture by determining a respective probability associated with each of a plurality of different gestures.

12. An apparatus according to claim 8 wherein the processor is configured to determine one or more relationships between a plurality of body parts by:
    determining the angle associated with a first joint;
    determining one or more states of a first body part based upon the angle associated with the first joint;

determining a probability of the first body part being in each respective state;

determining the angle associated with a second joint;

determining one or more states of a second body part based upon the angle associated with the second joint; and determining a probability of the second body part being in each respective state.

13. An apparatus according to claim 12 wherein the first joint is a shoulder with the associated angle defined by the elbow, shoulder and torso and the first body part is an upper arm, and wherein the second joint is an elbow with the associated angle defined by the shoulder, elbow and wrist and the second body part is a forearm.

14. An apparatus according to claim 8 wherein the processor is further configured to provide directions to an unmanned vehicle based upon the gesture.

15. A computer program product for recognizing a gesture, wherein the computer program product comprises at least one computer-readable storage medium having computer-executable program instructions stored therein, the computer-executable program instructions comprising:

program instructions configured to determine one or more relationships between a plurality of body parts, wherein the program instructions configured to determine each relationship comprise:
program instructions configured to determine an angle associated with at least one joint;
program instructions configured to determine one or more states of a body part based upon the angle associated with at least one joint; and
program instructions configured to determine a probability of the body part being in each respective state; and program instructions configured to determine the gesture based upon one or more states and the probability associated with each state of the body part, wherein the program instructions configured to determine the gesture comprise program instructions configured to identify one or more candidate gestures having respective probabilities of being the gesture and program instructions configured to report that the gesture was not recognized in an instance in which the respective probabilities fail to satisfy a predefined threshold.

16. A computer program product according to claim 15 wherein the program instructions configured to determine the gesture comprise program instructions configured to utilize a dynamic Bayesian network to determine the gesture.

17. A computer program product according to claim 16 wherein the program instructions configured to determine the gesture comprise program instructions configured to determine at least one subgesture utilizing another dynamic Bayesian network prior to utilizing the dynamic Bayesian network to determine the gesture based at least in part upon the subgesture.

18. A computer program product according to claim 15 wherein the program instructions configured to determine the gesture comprise program instructions configured to determine a respective probability associated with each of a plurality of different gestures.

19. A computer program product according to claim 15 wherein the program instructions configured to determine one or more relationships between a plurality of body parts comprise:

program instructions configured to determine the angle associated with a first joint;
program instructions configured to determine one or more states of a first body part based upon the angle associated with the first joint;
program instructions configured to determine the probability of the first body part being in each respective state;
program instructions configured to determine the angle associated with a second joint;
program instructions configured to determine one or more states of a second body part based upon the angle associated with the second joint; and
program instructions configured to determine the probability of the second body part being in each respective state.

20. A computer program product according to claim 19 wherein the first joint is a shoulder with the associated angle defined by the elbow, shoulder and torso and the first body part is an upper arm, and wherein the second joint is an elbow with the associated angle defined by the shoulder, elbow and wrist and the second body part is a forearm.

* * * * *